Patented Oct. 31, 1939

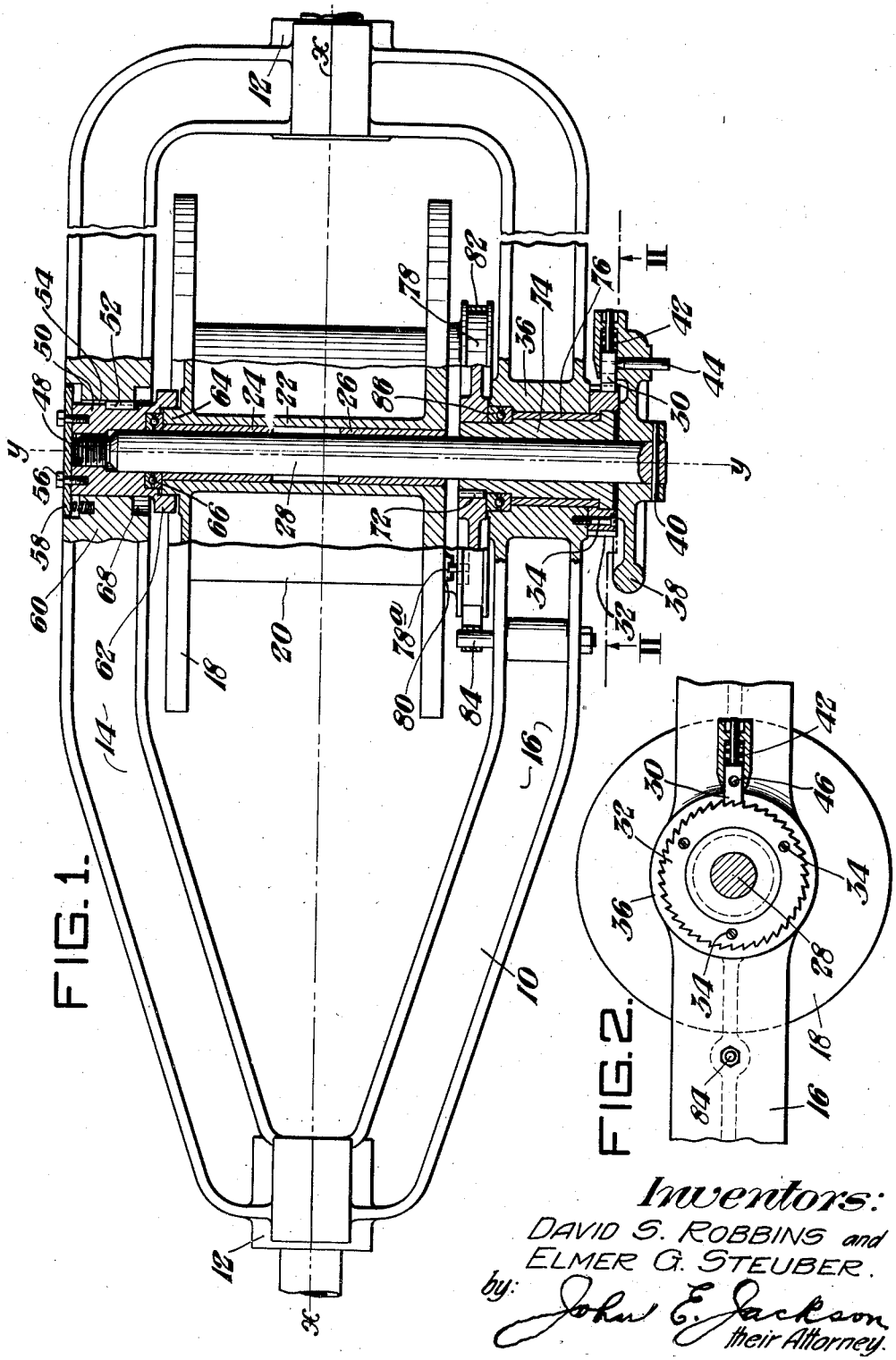

2,177,812

UNITED STATES PATENT OFFICE 2,177,812

STRANDING MACHINE SPOOL MOUNTING

David S. Robbins, Hamden, Conn., and Elmer G. Steuber, Philadelphia, Pa., assignors to The American Steel and Wire Company of New Jersey, a corporation of New Jersey Application February 18, 1939, Serial No. 257,180

8 Claims. (Cl. 57—59)

This invention relates to improvements in machines used in the manufacture of strand, rope or cable. Machines of this character employ fliers carrying cradles in which are mounted spools from which the wire or other component element is paid off in forming the strand, rope or cable. Heretofore the spools have been allowed to vibrate longitudinally because there was no provision for compensation of the wear or for taking up endwise play of the spool. This has resulted in what is known as "slap in the cradle" which results in poor mechanical operation and excessive upkeep costs. Such a spool slap in the cradle sets up vibration, brings about excessive wear and produces objectionable noises in a machine when running.

The present invention aims to overcome the above objections. One object of the invention is to provide a cradle carrying a spool rotatably supported by members including means effective to prevent endwise axial movement of the spool relative to the cradle so as to thus eliminate wear and also the objectionable slap, vibration and noise.

The above and further objects of the invention will be apparent from the following disclosure, when read in connection with the accompanying drawing, in which:

Figure 1 is a plan of the cradle of a stranding machine with portions broken away and shown in section to illustrate our improved spool supporting members; and Figure 2 is a fragmentary detail section taken on line II—II of Figure 1.

Referring in detail to the drawing, the numeral 10 represents generally a stranding machine cradle having bearing portions 12—12 of any conventional form to be mounted on trunnions to support the cradle for rotation about the axis X—X.

Disposed between side arms 14 and 16 of the cradle there is a spool 18 adapted to contain a coil of wire or other elemental strand material, such as indicated at 20. The present invention is directed to the improved means for mounting the spool 18 in such manner that endwise play relative to the cradle is effectively eliminated. The spool has an interior substantially hollow cylindrical body 22 which is provided in its bore with bearing sleeves 24 and 26 mounted on a cross shaft 28 which is normally held against rotation relative to the cradle by means of a spring pressed pawl 30 which engages teeth of a ratchet wheel 32 secured by suitable screws 34 to a hub portion 36 of the cradle arm 16. The pawl 30, as clearly shown in Figure 1, is slidably mounted in a cavity formed in a hand wheel 38 which is secured to the spool shaft 28 by a cotter pin 40 passing through the hub of the wheel and the shaft.

The pawl is normally urged toward the ratchet wheel 32 by means of a spring 42. However, the pawl can be held in a retracted position by means of a keeper pin 44, the inner end of which is tapered for engagement with a drilled hole 46 in the pawl. The relative positions of the hole 46 and the tapered inner end of the pin is such that, by forcing the pin inwardly, the pawl will be retracted by a sort of cam action and will be clear of the teeth of the ratchet. This will permit the shaft 28 to be turned by the hand wheel.

At the end remote from the hand wheel, the shaft is provided with screw threads 48 for engagement with internal threads formed in a bushing 50. This bushing carries a key 52 which coacts with a keyway 54 in such manner that, when the cross shaft 28 is turned by the hand wheel, an endwise motion will be imparted to the bushing. Secured to the outer extremity of the bushing by means of bolts 56 there is a plate 58 which coacts with a plurality of springs, one of which is shown at 60, to urge the bushing outwardly. The bushing 50 has an inner hub portion 62, the interior of which is recessed to form a seat for the end bearing portion 64 of the spool. Another recess formed in the bushing accommodates a ball thrust bearing 66 against which the end of the spool reacts. The arm 14 of the cradle is formed with a recess 68 to accommodate the bushing 50 when it is moved to an endwise position to clear the bearings 64 on the spool at times of insertion or removal thereof.

At the opposite end of the spool, adjacent the arm 16 of the cradle, there is a brake drum 78 whose hub is secured by a key 72 to a sleeve 74 which, in turn, is surrounded by a bearing sleeve 76. The brake carries a lug 78a which extends into the path of a coacting lug 80 projecting from the face of the adjacent flange of the spool. A suitable brake band 82 engages the face of the brake and is anchored to a brake stud 84 so as to exert a drag on the brake, which drag, through the lugs 78a and 80, is exerted on the spool, thus preventing the strand material from unwinding too rapidly therefrom.

The sleeve 74 is shouldered down, as shown in Figure 1, to properly accommodate a ball thrust bearing 86. The inner face of the brake makes a working fit against the adjacent face of the spool flange.

Normally the shaft 28 is held against motion relative to the yoke by means of engagement between the ratchet and pawl, as above described, and, as the wire is paid off from the spool, the latter rotates about the relatively fixed shaft as a center, the action of the brake serving to prevent overrunning of the spool.

Heretofore there has been no special provision to prevent endwise motion, or so called slap of the spool, other than that provided by the brake. A particular feature of the present invention is that, by manipulating the hand wheel 38, the slidably mounted bushing 50 can be drawn tightly against the thrust bearing 66 and then relieved a sufficient amount to afford a free or running fit. Thus, as contacting parts wear away, compensation for this wear can be readily made merely by adjusting the position of the bushing and locking the parts in juxtaposition by means of the pawl and ratchet connection, it being understood that, during the adjusting movement of the hand wheel, the pawl is held in its retracted position by means of a holding pin 44. The pawl will also be held in such retracted position when it is necessary to make spool changes, at which times it will be understood that the hand wheel will be turned in a direction opposite to that which it is turned in tightening the parts. At such times the springs 69 will assist in holding the bushing 50 in retracted position. With the bushing in such retracted position the threads 48 of the cross shaft will have been disengaged from the threads in the bushing, whereupon the cross shaft will be pulled endwise so as to permit an empty spool to be readily removed from the assemblage and thus facilitate the rapid substitution of a full spool. Upon the insertion of a new spool it will be understood that a similar operation will be performed in somewhat the reverse order, the new spool being positioned between the retracted bushing 50 and the brake drum 78, whereupon the shaft 28 is inserted through the spool and the hand wheel turned so as to cause the threaded end thereof, in coaction with the internal threads of the bushing 50, to draw the parts substantially to the position shown in Figure 1, at which time the holding pin 44 is withdrawn to release the locking pawl 30 to permit it to engage the teeth of the ratchet 32 and thus releasably lock the parts in the proper assembled relation.

While we have described quite precisely the embodiment of the invention herein illustrated, it is to be understood that we are not limited thereto, since various modifications and substitutions of equivalents may be made without departure from the invention as defined in the appended claims.

We claim:

1. In a device of the character described, a cradle carrying a spool and members rotatably supporting the latter including a bushing slidably keyed in the cradle, a spool supporting shaft having a screw threaded engagement with said bushing for moving it axially of the spool, and respective coacting means secured to the shaft and the cradle for adjustably locking the shaft to the cradle.

2. In a device of the character described, a cradle carrying a spool and members rotatably supporting the latter including a bushing slidably keyed in the cradle, a spool supporting shaft having a screw threaded engagement with said bushing for moving it axially of the spool, respective coacting means secured to the shaft and the cradle for adjustably locking the shaft to the cradle, and yielding means tending to move the bushing axially of the spool in a direction to take up play between the parts and thereby compensate for wear and prevent undesired axial spool movement.

3. In a device of the character described, a cradle carrying a spool and members rotatably supporting the latter including a bushing slidably keyed in the cradle, a spool supporting shaft having a screw threaded engagement with said bushing for moving it axially of the spool, and means tending to yieldingly move the bushing axially of the spool in a direction to take up play between the parts and thereby compensate for wear and prevent undesired axial spool movement.

4. In a device of the character described, a cradle carrying a spool and members rotatably supporting the latter including a bushing slidably keyed in the cradle, spring means effective to move the bushing away from the spool, a shaft on which the spool is mounted having means effective to move the bushing toward or from the spool, and respective means carried by the shaft and the cradle effective to adjustably position said bushing.

5. In a device of the character described, a cradle carrying a spool and members rotatably supporting the latter including a bushing slidably keyed in the cradle, spring means effective to move the bushing away from the spool, a shaft on which the spool is mounted having means effective to move the bushing toward or from the spool, a ratchet wheel secured to the cradle, and a member carried by the shaft carrying a pawl coacting with said ratchet wheel.

6. In a device of the character described, a cradle carrying a spool and members rotatably supporting the latter including a bushing slidably keyed in the cradle, spring means effective to move the bushing away from the spool, a shaft on which the spool is mounted having means effective to move the bushing toward or from the spool, a ratchet wheel secured to the cradle, a member carried by the shaft carrying a spring pressed pawl for coaction with the ratchet wheel, and means for holding the pawl in retracted position.

7. In a device of the character described, a cradle having arms on the opposite sides thereof, a spool between said arms, a bushing slidably keyed to one of the arms, a sleeve in the other arm, a cross shaft extending through said sleeve and having a threaded portion engaging internal threads in said sleeve, respective thrust bearings surrounding said cross shaft and carried by said bushing and said sleeve, cooperating portions on the bushing and the spool forming a free running bearing for the spool, cooperating elements supported respectively by one of the cradle arms, and a member carried by the cross shaft for adjustably locking the assembled parts in various desired positions of adjustment.

8. A device of the character described, a cradle including spaced arms provided with bearing elements adapted to support it for rotation by the longitudinal axis intermediate the arms, a spool whose axis of rotation is substantially perpendicular to said longitudinal axis of the cradle, a bushing slidable axially of the spool in one of the cradle arms, means preventing rotation of the bushing relative to said arms, means yieldingly tending to move the bushing away from the spool, a cross shaft extending axially through the spool and having a screw threaded engagement with the bushing, a manipulating member secured to the cross shaft carrying a spring pressed pawl, a ratchet for cooperation therewith secured to the arm of the cradle remote from said bushing, a sleeve secured to said remote arm supporting one end of said cross shaft, and respective thrust bearings mounted on said sleeve and said bushing.

DAVID S. ROBBINS.
ELMER G. STEUBER.